Nov. 10, 1931.  J. S. KEEN ET AL  1,831,711
TRAILER TRUCK
Filed March 16, 1931  2 Sheets-Sheet 1
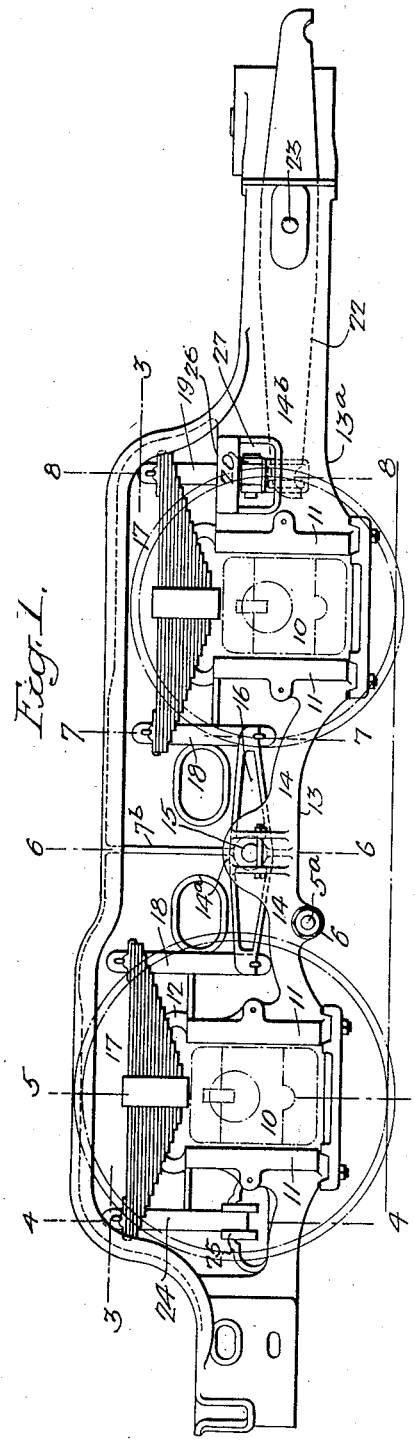
Inventors.
John S Keen
Ellwood M Shannon
by their Attorneys

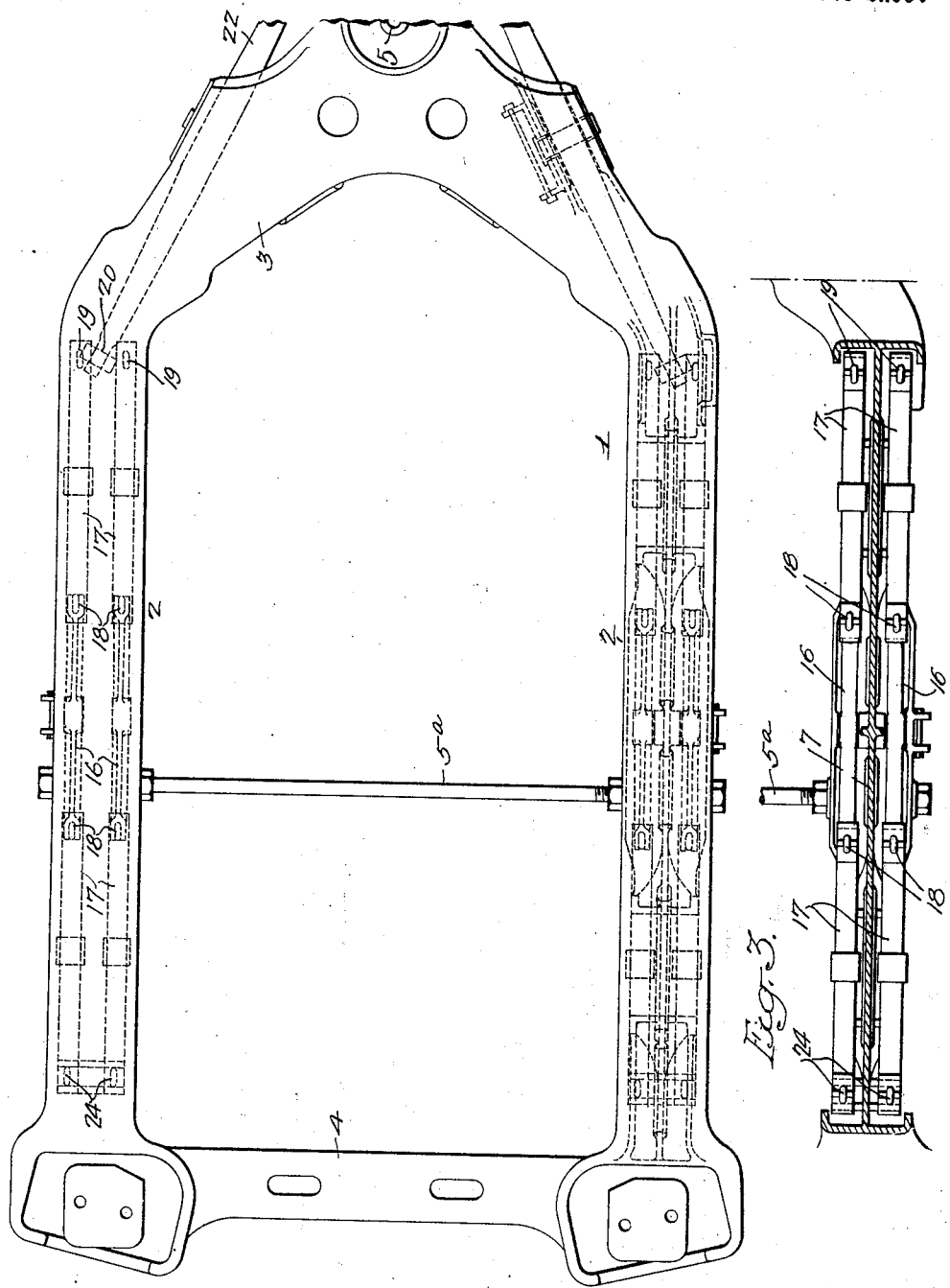

Patented Nov. 10, 1931

1,831,711

UNITED STATES PATENT OFFICE

JOHN S. KEEN, OF PHILADELPHIA, AND ELLWOOD M. SHANNON, OF BALA, PENNSYLVANIA

TRAILER TRUCK

Application filed March 16, 1931. Serial No. 523,074.

The object of our invention is to improve the construction of trailer trucks by providing equalizing mechanism in which the springs and the equalizing bars are arranged in pairs, this mechanism being located under the cross member of the T-frame of the truck. This application is a companion to the application filed by us on the 2nd day of March, 1931, under Serial No. 519,624.

In the accompanying drawings:

Fig. 1 is a side view of a trailer truck illustrating our invention;

Fig. 2 is a plan view of the truck;

Fig. 3 is a sectional plan view of one side of the truck on the line 3—3, Fig. 1;

Fig. 4 is a sectional view on the line 4—4, Fig. 1;

Fig. 5 is a sectional view on the line 5—5, Fig. 1;

Fig. 6 is a sectional view on the line 6—6, Fig. 1;

Fig. 7 is a sectional view on the line 7—7, Fig. 1; and

Fig. 8 is a sectional view on the line 8—8, Fig. 1.

1 is the body of the truck, consisting of side members 2 and transverse members 3 and 4. In the present instance the transverse members 3 and 4 are integral with the side members, and the member 3 forms a radius bar of the truck. In this radius bar is an opening 5 for the pivot pin. The two side members of the truck are connected about midway of the length of the truck by a crossbar 5a, which passes through lugs 6 on the side member 2. While we have illustrated a single cross-bar, additional cross-bars may be used if found desirable.

The side frames of the truck are T-shaped in cross-section as shown in the sectional views 4 to 8, inclusive. The vertical webs 7 are located on the longitudinal center line of each side member and the top cross members 8 of the T extend the full width of the side members and have downwardly turned flanges 9, which protect the springs and add materially to the strength of the structure. The web 7 is comparatively short above the axle boxes 10, which are located between the pedestals 11 of the side frames. The lower edge of the web 7, between the pedestals, has a comparatively heavy flange 12, which adds to the strength of the frame at this point.

At the center of the frame between the two pedestals the frame has a lower cross member 13 with vertical flanges 14 spaced from the central web, and at the center of the frame the flanges are increased in height to form bearings 14a for the fulcrum pin 15. This fulcrum pin extends through the bearing 7a in the vertical web 7. The bearing is of greater width than the web, and reinforcing ribs 7b extend on each side of the web and under the top cross member 8 and are connected to the downwardly turned flanges 9 as clearly shown in Fig. 6. This materially strengthens the frame at this point and gives substantial support for the fulcrum pin 15. 16 are two equalizing beams mounted on the fulcrum pin 15, one beam being located on one side of the central web and the other on the opposite side thereof, as clearly shown in Figs. 3 and 6. Resting on each axle box 10 are two semi-elliptical springs 17, one end of each spring being connected by a link 18 to an equalizing beam. The other end of each forward spring is connected by a link 19 to a block 20, having an opening 21 therein, into which extends one end of an equalizing beam 22. This beam is fulcrumed at 23 to the member 3 of the frame, and the outer end of this equalizing beam is shaped to engage a member of the main equalizing mechanism of the locomotive. The rear end of each rear spring 17 is connected by a link 24 to a rocker 25, which extends through an opening in the vertical web 7 and has its bearing on the web as shown in Fig. 4. The frame beyond the forward axle boxes has a lower cross member 13a and vertical flanges 14b, similar to the cross member and flanges of the frame between the boxes. The frame at this point has an integral horizontal member 26 with turned-down flanges and is perforated for the passage of the links 19, as shown clearly in Fig. 8.

The frame at this point has openings 27, so that access may be had to the pivot connections between the block 20 and its links, but the remainder of the frame is open so that access may be had to the semi-elliptical springs, their links and the equalizing beams.

We claim:

1. The combination in a locomotive trailer truck, of an integral truck frame having side members and transverse connecting members; pedestals forming part of the side members of the truck for the axle boxes, each side member being T-shaped in cross section, the vertical web of the T extending the full length of the truck and being less in height above the openings for the axle boxes, and having a lower transverse member with upwardly projecting flanges; equalizing mechanism on each side of the vertical web, each equalizing member consisting of semi-elliptical springs resting on the boxes of the truck and an equalizing beam connected to one end of each spring, one of said equalizing beams being on one side of the web and the other on the opposite side thereof; a rocker at the rear end of the truck, connected to the rear ends of the springs on each side of the web, and the forward end of each forward spring being connected to a block; and an equalizing beam fulcrumed on the forward transverse member and engaging the block, said equalizing beam being arranged to be connected to the main equalizing mechanism of the locomotive.

2. The combination in a locomotive truck, of an integral cast metal frame consisting of two side members and transverse connecting members, each side member having a central vertical web; a flanged top member and a flanged lower member; two equalizing beams, one at the center of each side member, one beam being on one side of the web and the other being on the opposite side of the web; two springs above each axle box of the truck, one being on one side of the web and the other being on the opposite side thereof; links connecting the springs with their respective beams; a rocker at one end of the truck; links connecting the rocker with the two springs at that end of the truck; a block at the forward end of the truck; links connecting the block with the springs on each side of the web; and an equalizing beam engaging the block.

3. The combination in a locomotive swing truck, of a frame consisting of side members and transverse connecting members, one of the connecting members being in the form of a radius bar, each side member having a vertical central web and having a lower cross member extending substantially the full length of the side of the truck; axle box openings in the side frame, the cross member being flanged between the boxes and beyond the boxes, the flanges between the boxes being extended to form bearings; a fulcrum pin extending through said bearings, and through the vertical web of the side member; two equalizing beams pivotally mounted on the fulcrum pin, one beam being on one side of the vertical web and the other beam being on the opposite side thereof; links connecting the beams with their respective springs; links connecting the rear end of each rear spring with the side frame of the truck; a block; and links connecting the block with the forward ends of the forward springs.

4. The combination in a locomotive truck, of a frame having side members and connecting members, each side member having a central web and an upper cross member forming a T with downward extending flanges; axle box openings in the vertical web; an integral cross member at the lower portion of the web between the axle box openings, said cross member having vertical flanges forming bearings for a fulcrum pin; a bearing for said pin in the vertical web; ribs extending from the bearings on each side of the web and extending to the outer ends of the upper cross member; two equalizing beams pivotally mounted on the fulcrum pin, one beam on one side of the vertical web and the other beam on the opposite side thereof; and springs above the axle boxes and connected to the said equalizing beams.

JOHN S. KEEN.
ELLWOOD M. SHANNON.